UNITED STATES PATENT OFFICE.

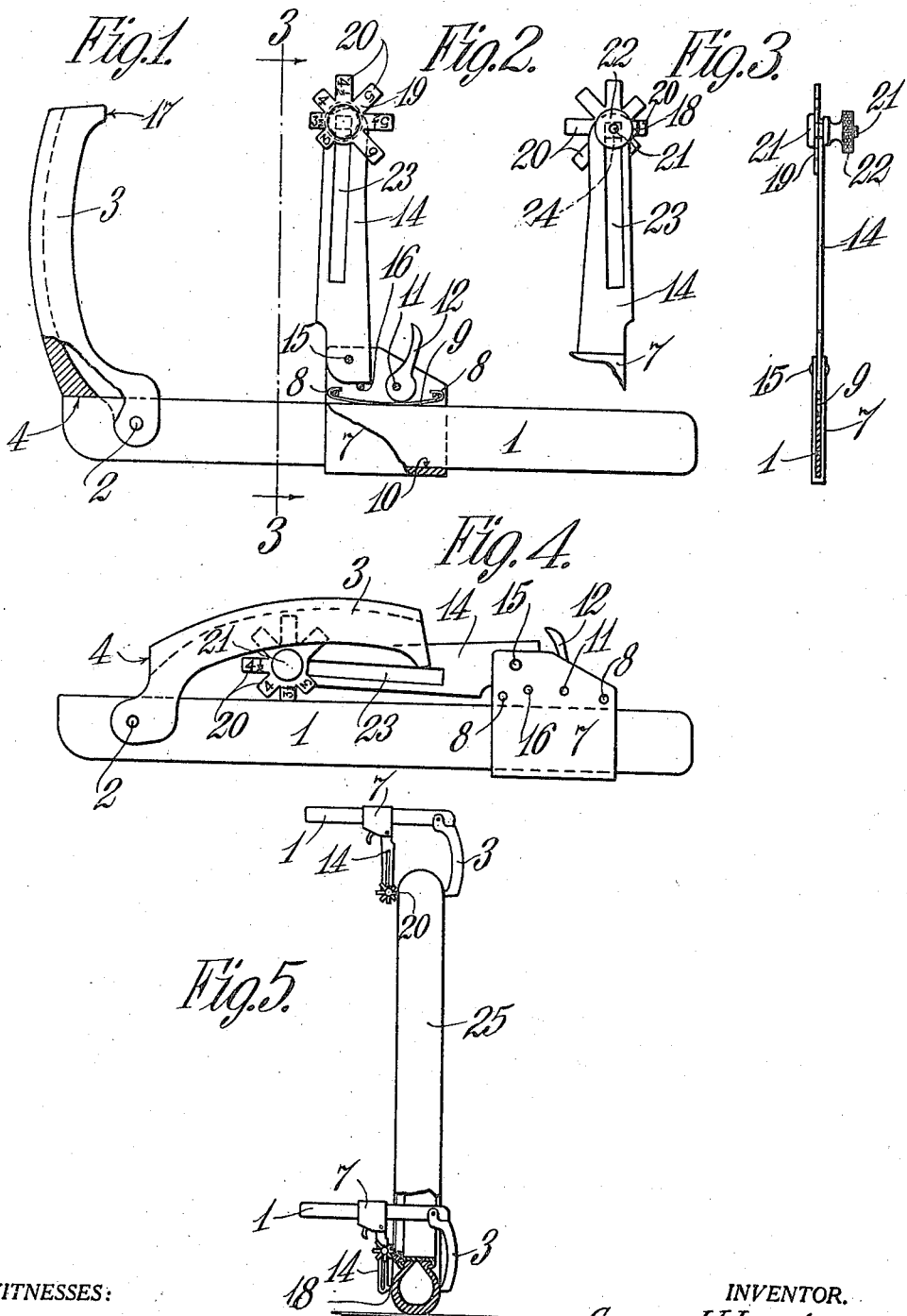

GEORGE HENRY LEWIS, OF CHICOPEE FALLS, MASSACHUSETTS, ASSIGNOR TO FISK RUBBER COMPANY, OF CHICOPEE FALLS, MASSACHUSETTS, A CORPORATION OF MASSACHUSETTS.

PNEUMATIC-TIRE CALIPERS.

1,238,535.

Specification of Letters Patent.   Patented Aug. 28, 1917.

Application filed January 19, 1916.   Serial No. 73,030.

*To all whom it may concern:*

Be it known that I, GEORGE HENRY LEWIS, a citizen of the United States of America, residing in Chicopee Falls, county of Hampden and State of Massachusetts, have invented certain new and useful Improvements in Pneumatic-Tire Calipers, of which the following is a specification.

This invention relates to tire calipers and, more particularly, to a measuring instrument constructed and arranged for the convenient determination of the proper amount of inflation of a pneumatic tire.

Commonly, heretofore, it has been the practice to use a pressure gage and to inflate the tire to a certain pressure as indicated by the gage. The several tires on the vehicle are, furthermore, usually inflated to the same pressure, irrespective of the varying loads thereupon. The result of such practice is that the front tires which bear the lighter load are distorted to a less degree than are the rear tires which bear the heavier load. The fabric of the tire will stand a certain amount of bending or distortion without injury, and it is, therefore, more desirable and more logical to inflate the tire to the proper amount to prevent excessive bending of the fabric rather than to inflate to some arbitrary pressure irrespective of the amount of bending of the tire fabric. Thus, the proper criterion of proper tire inflation should be the degree of distortion of the tire under load.

It is an object of this invention to provide a measuring instrument, preferably in the nature of a caliper, which is constructed and arranged for the convenient determination of the proper amount of inflation of a pneumatic tire by measurement of the distortion of the tire under load.

Another object of the invention is to provide a calipering instrument of the class described having jaws, one thereof being adjustable, which may be set to the diameter of an undistorted part of the inflated tire, and means on one of the jaws movable without disturbing the setting of the jaws to indicate the proper diameter of the tire when distorted under load.

Other objects and advantages will appear in the description to follow and in the annexed claims.

Referring to the drawings, as illustrative of one preferred manner in which the invention may be practised—

Figure 1 is a front elevational view partly in section of the caliper;

Fig. 2 is a rear elevational view of a portion of Fig. 1;

Fig. 3 is a sectional view taken on the line 3—3 of Fig. 1 and looking in the direction of the arrows;

Fig. 4 is a view taken similarly to Fig. 1 showing the parts in folded position; and Fig. 5 is a diagrammatical view illustrative of the manner of using the caliper.

Referring to these drawings in detail; 1 represents the blade of the caliper, which is preferably a flat thin piece of metal. Pivoted to the blade at 2 is a jaw 3, which is channeled out as shown for a purpose to be described, and has a surface 4 adapted to abut with the top edge of blade 1, when the jaw is positioned as shown in Fig. 1, to limit its movement in a counterclockwise direction. Movably mounted on blade 1 is a slide 7 which is U-shaped in cross section as shown in Fig. 3. Loosely mounted on spaced pins 8 between the spaced walls of the slide 7 is a spring 9 which is adapted to bear on the upper edge of the blade and hold the surface 10 of the slide frictionally in engagement with the lower edge of the blade. Pivotally mounted on a pin 11 secured to the spaced walls of slide 7 is a locking member 12 having an eccentric lower part adapted, when positioned as in Fig. 1, to force spring 9 against the upper edge of the blade and lock the slide to the latter in an obvious manner. A second caliper jaw 14 fits closely between the spaced walls of the slide 7 and is pivotally secured thereto by a pin 15. A pin 16 is arranged in the path of and is adapted to abut with jaw 14, when the latter is positioned as in Fig. 1, to limit its movement in a clockwise direction.

The jaws 3 and 14 have integral projections 17 and 18 (the latter being best shown in Fig. 2) respectively between which measurements may be taken in the usual manner. The jaw 14, however, has movably mounted thereon a plate 19 formed with a plurality of projections 20 each of which is similar to the integral projection 18, and any one of which may be moved into position as shown in Fig. 1 to overlap the projection 18. The plate 19 is held to the jaw 14 by a stud 21 and thumb nut 22 and the former has a squared portion 24 which fits in a groove 23 formed in jaw 14. These projections, as shown in Fig. 1, are of various lengths and are adapted to project to various distances beyond the projection 18. The distance of overlap of any projection 20 beyond the projection 18 is the increment of increase in diameter of the tire when distorted under load which by experiment is found to be permissible without causing excessive bending of the fabric of the tire for the particular size of tire, marked on the projection as shown in Fig. 1.

When the caliper is not in use, the jaws 3 and 14 may be moved to the position shown in Fig. 4, and it is to be noted that the channeled interior of jaw 3, heretofore described, permits the plate 20 to extend therein so that the parts may be folded into the compact form shown. When it is desired to use the caliper, jaws 3 and 14 are swung counterclockwise and clockwise, respectively, on their pivots into the positions shown in Fig. 1.

If it be assumed that the tire 25, conventionally shown in Fig. 5, is to be tested for proper inflation, the plate 19 is turned so that the projection 20 marked with the diameter of tire 25, say, for example, 3½ inches, lies in front of projection 18, as shown in Fig. 1. The clamp 12 is moved counterclockwise to permit slide 7 to move on blade 1 and the former is moved so that the upper undistorted part of tire 25 just fits between projection 17 and projection 20, as shown in the upper portion of Fig. 5. The member 12 is then moved to clamp slide 7 to the blade after which the thumb nut 22 is loosened and the plate 19 moved to the bottom of slot 23, as shown in the lower part of Fig. 5. Thus the projection 18, formerly behind projection 20, is exposed, and the distance between the former and projection 17 is the diameter of the tire under load, which is permissible and proper without excessive bending or strain on the fabric of the tire. The lower part of the tire, which is subjected to load and distorted as indicated, is then calipered between projections 17 and 18. If the diameter is greater or less, then the tire is inflated or deflated, as the case may be, until the proper diameter is reached as indicated by the distance between projections 17 and 18.

Thus, I have provided a most convenient form of caliper for tires, whereby the proper amount of inflation of a tire may be determined by measurement of its increase in diameter when subjected to load. It is recognized that modifications may be made in the structure herein described without departing from the scope of my invention which is defined by the appended claims rather than by the foregoing illustrative description of one preferred form.

What I claim is—

1. The combination in a caliper with the relatively movable jaws thereof, said jaws having suitable coöperating measuring portions, of a movable member on one of said jaws having a plurality of projections each of which is provided with an indicating mark and any one of which may be moved to temporarily take the place of the measuring portion on the last-named jaw, and means to adjustably secure the member to its jaw, said means and member constructed and arranged to permit the latter to be moved to a position to expose the measuring portion of the jaw, for the purpose described.

2. A tire caliper, comprising, a pair of jaws having coöperating measuring points, a blade on which said jaws are mounted for relative movement, and a movable member on one of said jaws having a plurality of measuring projections any one of which may be moved to temporarily take the place of the measuring point of the last-named jaw, said jaws adapted to be set so that the diameter of an inflated tire undistended by load is indicated between the measuring point on one jaw and a selected projection on the other jaw, said member arranged to be moved to expose the measuring point on its jaw, all constructed and arranged so that the distance between said measuring points indicates the maximum permissible diameter to which the tire may be distended under load.

3. A tire caliper, comprising, in combination, a pair of measuring jaws having coöperating measuring portions, a member on which said jaws are mounted and a device movably mounted on one of said jaws and formed with a plurality of projections, any of said projections arranged to be moved to overlap the measuring portion of said last-named jaw and to project therebeyond, each of said projections marked with the diameter of the tire with which it is to be used and the distance between the projection and the measuring portion of said last-named jaw arranged to indicate the permissible increment by which the diameter of the tire may be increased by load, all constructed and arranged for the convenient determination of proper inflation of the tire for a given load.

4. A tire caliper having coöperating parts between which the diameter of an inflated tire undistended by load may be measured and means associated with one of said parts to indicate for various sizes of tires the safe increment by which the diameter may be safely increased by load.

5. A tire caliper, comprising, in combination, a blade, a jaw mounted thereon, a second jaw slidable on the blade, each of said jaws having suitable coöperating measuring portions and a plate movably mounted on the last-named jaw and formed with a plurality of projections thereon, each of said projections having marks thereon to indicate the diameter of the tire with which it is to be used and arranged to be moved into position to overlap and project beyond the measuring portion of said last-named jaw, all constructed and arranged for the setting of said jaws so that the distance between the appropriate projection and the measuring portion of the first-named jaw is equal to the diameter of the inflated tire undistended by load and so that when the projection is moved to expose the last-named jaw to indicate by the distance between said jaws, the maximum diameter to which the tire may safely be distended by load.

6. A tire caliper, comprising, in combination, a blade, a jaw pivotally connected thereto, a slide movably mounted on the blade, a second jaw pivoted to the slide, said jaws having suitable coöperating measuring points and being arranged to swing from positions substantially parallel with said blade to positions substantially at right angles thereto for measuring purposes, and a plate rotatably and slidably mounted on the last-named jaw, a plurality of projections on said plate each marked to indicate the size of tire with which it is to be used and arranged to be turned into position to overlap and project beyond the measuring point of said last-named jaw, the extent of the projection beyond said measuring point arranged to indicate as a guide to proper inflation the permissible increment by which the diameter of the tire may be safely increased when distended under load.

7. A tire caliper, comprising, in combination, a blade, a measuring jaw pivoted thereto, a slide movable on the blade, means to clamp the slide to the latter, a second measuring jaw pivoted to the slide, each of said jaws having suitable coöperating measuring points and adapted to be moved from a position substantially parallel with the blade to a position substantially normal thereto for measuring purposes, a plate rotatably mounted on the last-named jaw and movable longitudinally thereon and a plurality of projections of different lengths formed on said plate and each marked to indicate the size of tire with which it is to be used each of said projections adapted to be swung into position to project beyond and overlap the measuring point of the last-named jaw, whereby, when the proper projection for the tire to be measured is so positioned, the jaws may be set so that the proper diameter of the inflated tire undistended by load is equal to the distance between the projection and the first-named jaw, and thereafter, when the plate is moved longitudinally on the jaw away from its measuring point the distance between the two jaws is equal to the diameter to which the tire may be safely distended by load whereby the tire may be calipered for proper inflation.

GEORGE HENRY LEWIS.

Copies of this patent may be obtained for five cents each, by addressing the "Commissioner of Patents, Washington, D. C."